United States Patent [19]

Fahrenholz

[11] 4,167,975

[45] Sep. 18, 1979

[54] BEACH CLEANING APPARATUS

[76] Inventor: Harley D. Fahrenholz, P.O. Box 278, Clarissa, Minn. 56440

[21] Appl. No.: 831,644

[22] Filed: Sep. 8, 1977

[51] Int. Cl.[2] .............................................. A01D 17/18

[52] U.S. Cl. .......................................... 171/12; 171/92

[58] Field of Search .............................. 171/12, 63, 92; 130/30 R, 30 H; 56/328 R, 327 R

[56] References Cited

U.S. PATENT DOCUMENTS

| | | | |
|---|---|---|---|
| 2,780,904 | 2/1957 | Bowie et al. | 56/328 R |
| 3,390,768 | 7/1968 | Button | 130/30 R X |
| 3,593,868 | 7/1971 | Folz | 214/356 |
| 3,678,677 | 7/1972 | Miller et al. | 56/327 R |
| 3,769,988 | 11/1973 | Burenga | 130/30 H |
| 3,782,477 | 1/1974 | Fahrenholz | 171/12 |
| 3,825,018 | 7/1974 | Ferraro | 130/30 H |

FOREIGN PATENT DOCUMENTS

| | | | |
|---|---|---|---|
| 459234 | 5/1928 | Fed. Rep. of Germany | 56/345 |

*Primary Examiner*—Russell R. Kinsey
*Attorney, Agent, or Firm*—Kinney, Lange, Westman and Fairbairn

[57] ABSTRACT

An apparatus for cleaning beaches including a conveyor that will pick up foreign objects from a beach, elevate such objects together with accumulated sand, a tumbler which receives the material and rotates to separate the material from sand, a brush to unclog openings in the tumbler, and a conveyor that will move the large objects to a desired storage location.

10 Claims, 6 Drawing Figures

BEACH CLEANING APPARATUS

BACKGROUND OF THE INVENTION

1. Field of the Invention

The present invention rleates to beach cleaning devices, which remove material from a beach surface.

2. Prior Art

Various devices for lifting materials from the ground have been advanced. For example, my U.S. Pat. No. 3,782,477 shows a type of rock picking device which is modified in the present instance to constitute a beach cleaning apparatus through the addition of material collecting mechanism and apparatus to keep a separating screen free of foreign materials.

SUMMARY OF THE INVENTION

The present invention relates to a device which gathers objects from the surface of a sandy beach, for example, and moves these objects onto a conveyor that elevates the objects into the interior of a rotating screen encased drum. The drum is rotated under power in a desired manner, and can be made to have an annular screen surface that separates the large objects such as bottles, papers, cans and the like from the sand. In the interior of the drum there is provided a rotating brush that keeps the openings of the screen unplugged as the drum rotates, and as the brush rotates relative to the drum so that the beach cleaner will remain operable even if slightly wet sand is picked up with the foreign objects. The drum then lifts the larger objects which do not pass through the screen onto a conveyor that conveys the objects to a storage hopper or to some other desired location.

The beach cleaner thoroughly picks up a wide area by having wings or guide plates which are free to float or move across the surface of the sand, and which guide material in toward a center pick up conveyor. An overhead rotating flexible bladed beater engages debris such as papers, cans and bottles and tends to impel them up onto and over a roller that rotates along the surface of the ground. Once lifted over the roller the objects move onto a conveyor belt, and then into the rotating cage (tumbler) which rotates about a generally horizontal axis. The cage has a suitable size annular screen peripheral wall portion which permits sand and smaller rock to pass therethrough, while large pieces of paper, bottles and cans will be carried to the rear of the rotating cage and then subsequently will be lifted out into a second conveyor that leads to a storage hopper or the like.

The device does not require substantial power to operate, and is pulled along the ground through the use of a suitable prime mover such as a tractor.

DESCRIPTION OF THE PREFERRED EMBODIMENT

Figures 1, 2, 6:
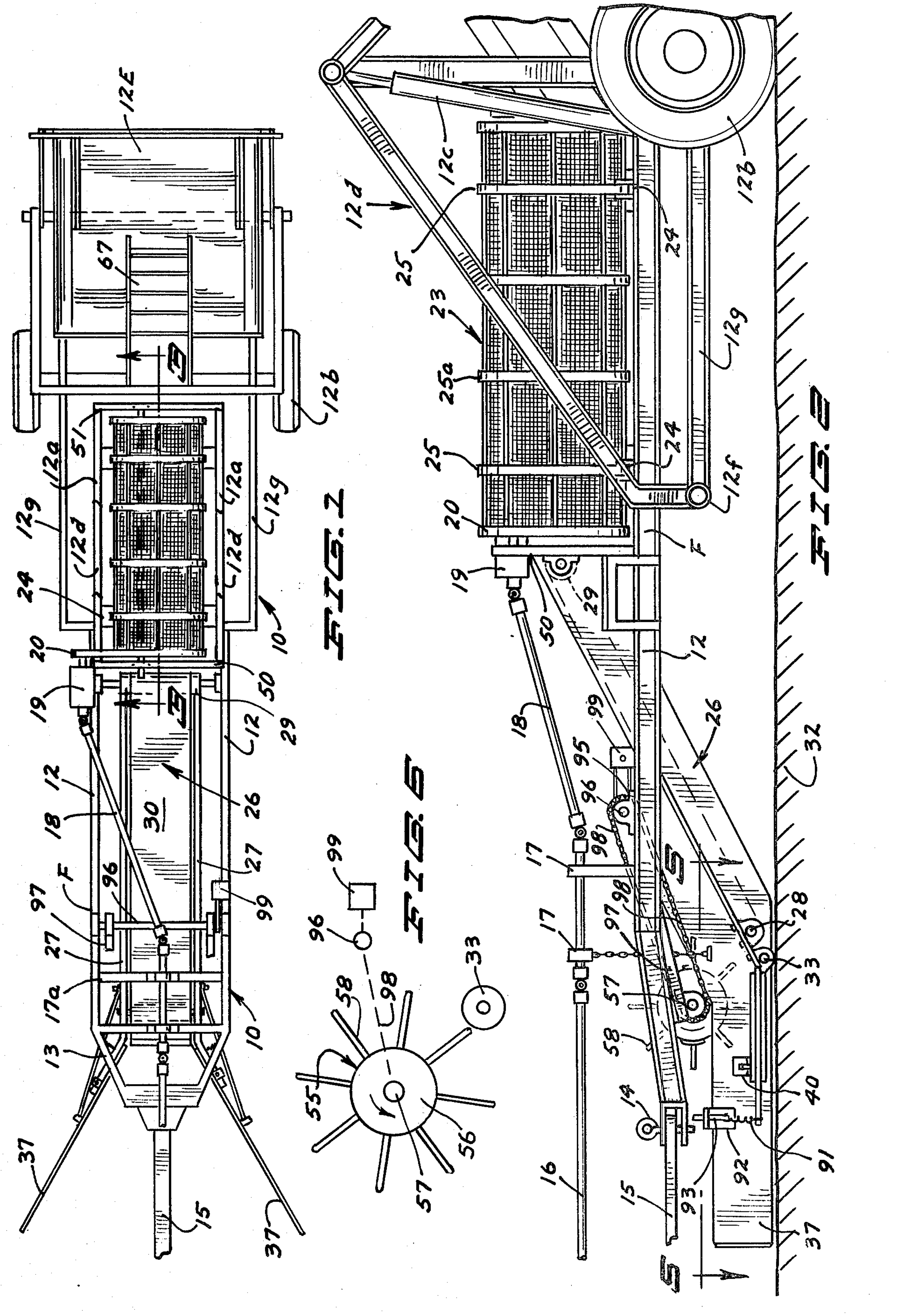
FIG. 1 is a top plan view of a beach cleaner made according to the present invention.
FIG. 2 is a fragmentary enlarged side view of the device of FIG. 1 showing the forward portions thereof.
FIG. 6 is a fragmentary view showing the beater and roller for moving material into the pick up conveyor.

The present construction is similar to the construction of my rock picker shown in my U.S. Pat. No. 3,782,477 and many of the details of construction are thus not included in this present description, insofar as support wheels and the like are concerned. However, referring to FIGS. 1 and 2 in particular, it can be seen that the beach cleaning attachment of the present invention indicated generally at 10 includes a main frame F which has longitudinally extended side stringers 12 comprising main frame members, and these are joined together by a tapered forward portion indicated generally at 13. A suitable hitch pole and clip indicated at 14 is used for attaching the cleaner to the drawbar 15 of a tractor or other towing vehicle, which has a power take-off drive illustrated schematically at 16 to drive the powered components. Such powered components are not illustrated in any detail, and it is to be understood that the components can be driven through separate hydraulic motors which operate from a pump or a prime mover.

As shown, however, the power take-off shaft 16 is mounted on cross members 17*a* which are supported by upright supports indicated generally at 17 near the front of the frame members 12. A drive shaft indicated at 18 is drivably mounted and connected to and between shaft 16 and a gear box that is schematically shown at 19 which is used for driving a pulley on an output shaft and thus driving a belt 20. Belt 20 wraps around a rotating tumbler cylinder indicated generally at 23 for driving the cylinder 23. The tumbler cylinder is supported on the frame and has a longitudinal axis about which it rotates extending generally parallel to the direction of travel of the frame, and it is mounted on suitable support rollers 24, which act upon annular bands 25 positioned around the tumbler. The rollers are mounted on frame portions 12*a*. The means for supporting the tumbler, and the general construction of the tumbler is similar to that shown in U.S. Pat. No. 3,782,477, except in this case the tumbler has fewer longitudinal reinforcing members and has an annular screen cover as will be more fully explained. In any event the tumbler is rotated about its axis which extends in fore and aft direction, and it should be noted that the axis also tilts slightly downwardly toward the rear so that the lower edge of the tumbler slants downwardly so that the material in the tumbler will move toward the rear of the tumbler.

A pick up conveyor assembly, generally designated 26, is mounted between the side frame members 12 and is formed in a normal manner for such conveyor assemblies including longitudinally extending side frame members 27, and a pair of spaced apart shafts 28 and 29, respectively at opposite ends of the side frame members 27. The side frame members can be channel shaped members or other desired types of members. The shafts 28 and 29 support rollers that mount an endless conveyor belt shown at 30, which has an upper length or run that travels in a rearward and upward direction from the lower shaft and roller 28 to the upper shaft and roller 29. The upper shaft 29 is mounted in suitable bearings with respect to the frame F in a normal manner, and the lower end of the conveyor can be supported with adjustable members suspending from a cross member 17*a*. In practice, chains 17*b* can be used for supporting the lower front end (pick up end) of the conveyor in a suitable way, or if desired other devices could be utilized. The lower end of the conveyor therefore extends closely adjacent to the beach surface indicated generally at 32 and the conveyor will convey material picked up from this surface rearwardly and upwardly. A transversely elongated feed roller 33 is rotatably mounted in suitable bearings with respect to the side frame members 27 and is positioned just ahead and below the end of the conveyor belt 30 so that this roller will actually run along the surface of the ground and it is rotated in a clockwise direction as is indicated in FIG. 2 so that the material will tend to be flipped up over the roller and onto the conveyor belt. The roller can have ribs extending along its length if desired to aid in picking material up, and can be rotated in any desired speed. The conveyor belt and roller 33 can be driven through suitable chain members from the gear box 19, or else can be directly driven with suitable hydraulic motors. The conveyor may also carry suitable shields or plates along its side for guiding material to prevent it from falling off the conveyor, particularly at the forward end.

A pair of outwardly diverging frame members 36 are fixed to the frame members 27 in a suitable manner and extend forwardly and then diverge outwardly from the members 27. The frame members 36 are used for supporting a pair of wing guide members (guide plates) 37 which are attached to the frame members 36 through a single bolt connection 38 for each guide plate. The bolt connections 38 permit the wing members to move slightly from their diverged position as shown because the use of a spring 39 on the bolt between the frame member 36 and the nut on the bolt. Thus the bolt is spring loaded, and the head of the bolt 38 will permit the front ends of the wings not only to move up and down (pivot about the axis of the bolt), but also the wings can compress the springs slightly to permit the guide plates moving back and forth a limited amount. The downward movement of the forward end of each of the wing members 37 is limited through an adjustable stop indicated at 40. This stop 40 comprises a clip that is welded to the wing member a substantial distance horizontally forwardly of bolts 38, and a stop bolt that is threaded through a nut welded onto the clip. The stop bolt head bears downwardly against the upper edge of the frame members 36, and when the bolt engages the frame member 36 further downward movement of the wing members is prevented. However, the wing members can move upwardly at their outer forward ends to float over irregularities in the beach surface, or rocks or the like because the stops will permit such movement of the wings about the axis of the bolts 38.

The movement of the wings transversely outwardly at their forward ends is limited through the use of a compression member, indicated generally at 41, on each side of the machine. The compression member comprises a pipe 41*a* that is mounted in a support socket 42 which in turn is mounted by a bracket 43 that is mounted on the respective frame member 27.

The supports 42 are merely short tubular sockets into which the tube 41*a* will fit loosely. The sockets 42 are of larger diameters than the tubes 41*a* so that the tubes 41*a* can move back and forth, but of course can't move longitudinally beyond the end of the tube 42. Each tube 41*a* extends outwardly (forwardly) into a second tube 44 which is attached with a bracket 45 to the wing 37 at a desired location. The length of the tubes 41*a* therefor determine the maximum degree of divergence, or the amount of divergence of the wings 37. The tube portion 44 is also of larger diameter than the brace tube 41*a* so when the wings lift up or tend to tilt, the braces 41*a* permit some movement, but they will not permit the front ends of the wings to move rearwardly very much because the braces 41 resist compression.

It can therefore be seen that the wings diverge to cover a wide swath of beach during the cleaning operations, and can float over irregularities or objects, but yet will scrape the top portions of the sand on the beach to guide paper, cans, bottles, and other debris in toward the roller 33 and the conveyor assembly 26.

To aid in retaining the front end portions of the guide plates 37 in contact with the beach surface there are provided braces 90 having rear ends secured to members 27 and that diverge from one another in a forward direction. The front ends of the braces 90 have the lower ends of coil springs 91 secured thereto, the upper ends of the springs being connected to bolts 93 that are mounted by brackets 92. The brackets are mounted on the guide plates forwardly of bolts 38. The bolts 93 can be slidably extended through the brackets and adjusted vertically by varying the threaded positions of the nuts thereon which secure the bolts to the brackets. Thus the spring tension applied to the guide plates can be varied.

Figure 5:
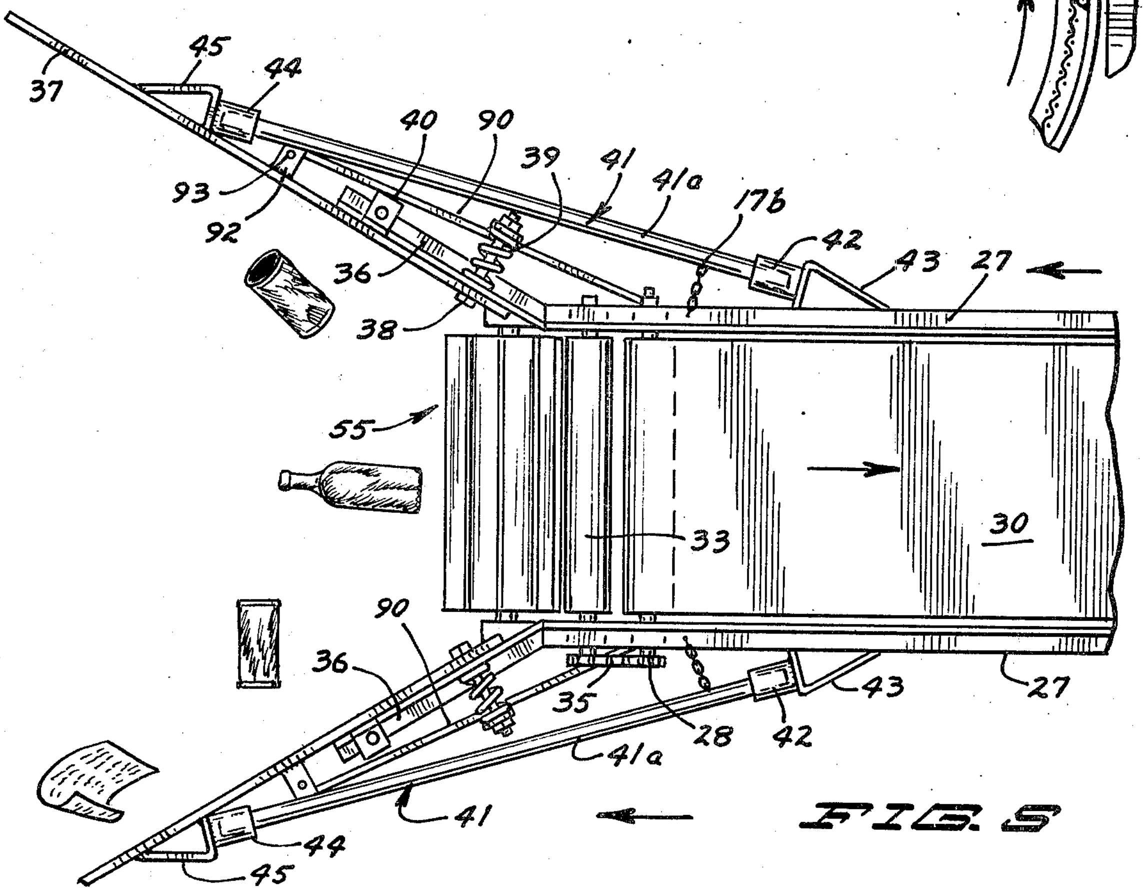
FIG. 5 is a fragmentary enlarged top plan view of the forward portion of the beach cleaner showing the gathering wings and conveyor construction used for gathering debris into the pick up conveyor member.

As previously explained, the forward end of the conveyor assembly can be held upwardly with respect to the overhead frame 17 through the use of chains 17*b* which are illustrated only partly schematically in FIG. 5. Thus by adjusting the chain, the depth at which the front end of the conveyor runs with respect to the main frame 12 can also be controlled.

The rear portions of the frame members 12, as shown are connected to frame portions 12*d*. The entire frame assembly is supported on wheels 12*b* which are supported through hydraulic cylinders 12*c* with respect to a framework 12*d* that in turn is attached to the frame members 12*a*. A collector box 12*e* can be positioned to the rear of the unit, and will be used for storing debris and the like. This construction is identical to that shown in U.S. Pat. No. 3,782,477 and is shown therefore only schematically. The entire unit can be lifted up by operating the hydraulic cylinders 12*c* which permits the wheels to pivot about a support tube 12*f* on arms 12*g* that support the axle for the wheels 12*b*.

The frame members 12 support overhead bridge type supports 50 at the forward end of the tumbler 23, and 51 at the rear end of the tumbler. However, these bridge type supports are not used for supporting the tumbler itself as previously explained in that the tumbler is supported on rollers 24 along the lower edge portion of the tumbler.

At the infeed end of the conveyor, in order to aid in feeding in light objects such as paper, paper cups, or even light aluminum cans, a beater assembly indicated generally at 55 is provided. The beater assembly includes a drum 56 of a suitable diameter, having a center shaft 57, that is rotatably mounted in bearings dependingly mounted by the forward ends of arms 97. Other bearings mount the rearward ends of arms 97 to a shaft 96 which can rotate relative the arms, the shaft 96 in turn being rotatably mounted by bearings 95 which are mounted by frame members 12. Chains (not shown) are extended between arms 97 and the front frame member 17 whereby shaft 57 is retained in a given vertical adjusted elevation. Drive structure, schematically indicated in FIG. 6, is provided and may include a chain drive 98 between shafts 57 and 96 together with a hydraulic motor 99 coupled to shaft 96 for driving shaft 96.

Figure 3:
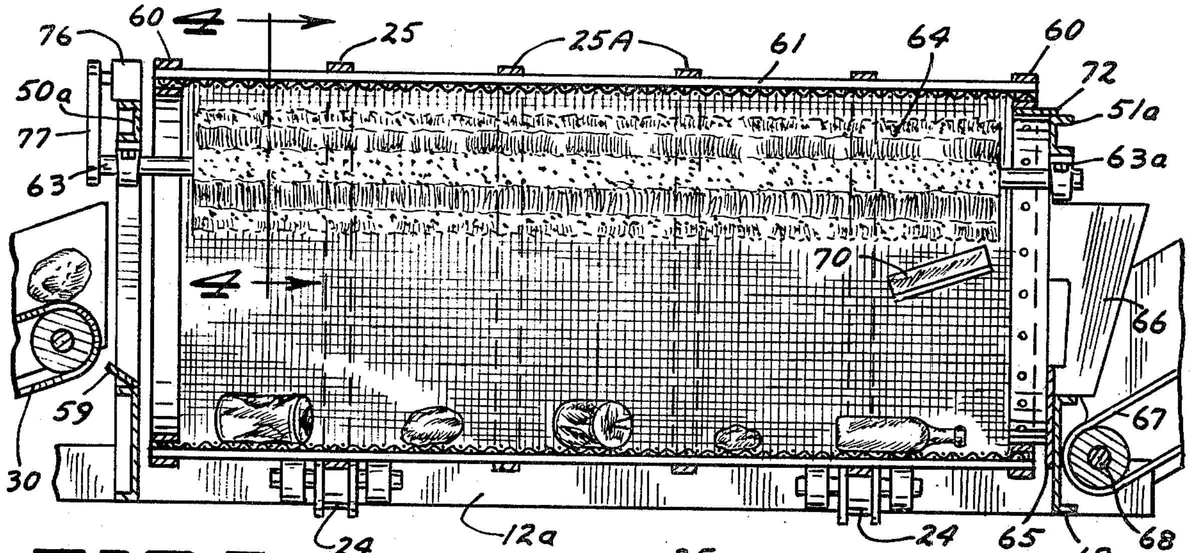
FIG. 3 is a fragmentary enlarged vertical sectional view of a rotating screen cage forming part of the beach cleaner of the present invention.

A plurality of floppy resilient blades 58 are joined to drum 56 to extend radially outwardly therefrom. There are six blades as shown, and these flaps may be made of a suitable conveyor belting which has some rigidity, but will not damage or break bottles or the like. The blades give under normal hand pressure, but will return to their radial position if there is no force on the blades. These blades then are of sufficient length so that they come close to the surface of the roller 33, and will hit and urge material such as paper cups up over the roller 33 and onto the conveyor belt so that these objects will be conveyed up by the belt toward the rear of the unit. As shown in FIG. 3, objects coming off the belt 30 will be transported past the overhead framework 50 and through an opening in a guide plate 59, and into the interior of the tumbler assembly 23.

Figure 4:
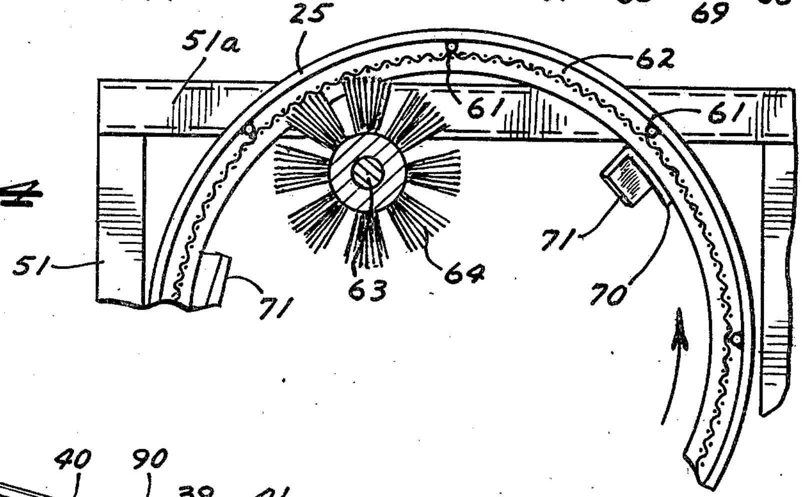
FIG. 4 is a fragmentary sectional view taken as on line 4—4 in FIG. 3 showing the brush for brushing the screen cage.

In FIGS. 3 and 4 the tumbler construction is shown in somewhat more detail. Besides the major bands 25 which ride on the rollers 24 as previously explained, there are annular bands **25*a*, and end bands 60 that are annular. Longitudinal ribs 61 are fixed to these annular bands, at spaced intervals as generally shown in FIG. 4, and a screen material 62 of suitable size, for example, a mesh screen of approximately half inch square openings is attached to the members 61** to form an annular screen tumbler or drum. The drum is a cylindrical member that is open at both ends and rotates about its axis which tilts downwardly in rearward direction slightly from the horizontal.

The cross members **50*a* and 51*a* of the overhead support structures 50 and 51, respectively are used for supporting suitable bearings 63*a* which in turn support a shaft 63 that mounts a cylindrical brush assembly 64. The brush 64 is positioned so that the bristles thereof engage the screen adjacent the upper portions of the tumbler, and will brush the screen so that material tending to clog the openings of the screen will be dislodged and will drop down into the lower portions of the tumbler. Also, at the rear portion of the tumbler there is a plate 65 which is attached to the cross support frame member 69, and has a part cylindrical opening that is above the lower edge of the tumbler and this opening in the plate leads to a guide chute 66 which overlies a second conveyor belt 67 mounted on a lower roller 68 and which is also mounted on an upper roller so that it will convey material upwardly and into the box 12*e* shown in FIG. 1. This conveyor belt 67** is also shown in U.S. Pat. No. 3,782,477, and serves to transport material such as cups, bottles and other debris into the storage container as the beach cleaner moves along the beach.

Guide vanes are positioned on the interior of the tumbler adjacent the rear portions and they are positioned at an angle, and have an upright extending leg. These guide vanes indicated at 70 each has a leg 71 that extends away from the screen, and as the tumbler rotates (in counterclockwise direction as indicated in FIG. 4) these guide vanes will urge the debris rearwardly toward the rear opening of the tumbler and tend to lift the material up and over the edge of the plate 65 into the chute 66 and out into the conveyor 67. Any desired number of such guide vanes can be utilized, and the longitudinal length of the vanes generally will be in the range of 12 inches or so, although they can be as long as desired. The outwardly extending leg 71 will primarily be of a flexible belting material to prevent breakage of bottles, but the vanes can be made of any desired material.

Further, the rear of the tumbler assembly, and the rear annular member 60 carries a flexible rubber seal indicated at 72 that is bolted around this member 60 and extends annularly therearound to define the opening at the rear of the tumbler. The edge of this flat rubber strip 72 engages the surface of the plate 65, for a portion of the diameter of the tumbler, something over one-half of the diameter up around the edge, and will seal the normal opening between the end of the tumbler and the plate 65 to insure that debris does not fall down between the tumbler and the chute 66.

The brush assembly 64 can be driven with a hydraulic motor 76 as shown in FIG. 3, which is shown only schematically and is mounted on the cross member **50*a*, and it can drive the shaft 63 through a suitable belt 77. Additionally, of course, the conveyor 67 would be driven in the usual manner to move material upwardly into the storage hopper 12*e***.

Therefore, the beach cleaner assembly cleans a wide swath area through the use of the guide plates 37 that are mounted for limited movement, a flexible bladed beater that urges the debris onto the front conveying assembly that in turn conveys the material into a screen tumbler which has mesh openings of suitable size, and a cleaning brush 64 for removing wet sand or the like which may tend to plug the openings in the screen. The tumbler separates the sand out so that it can drop back onto the beach, and the debris will stay in the tumbler and be ejected out through the rear opening onto a conveyor and into a storage hopper until the hopper is full, at which time, of course, the hopper can be dumped in a suitable manner.

What is claimed is:

1. A beach cleaner for removing objects from the surface of a sand beach and for separating larger objects from sand picked up by the cleaner comprising a longitudinally extending frame, means to support the frame for movement over the surface of a beach, a tumbler member rotatably mounted on the frame for rotation about a fore and aft extending axis which slopes downwardly in a rearward direction relative to the normal direction of movement of the beach cleaner, said tumbler including an inlet, and an outlet positioned rearwardly of the inlet, and a peripheral wall extending between the inlet and outlet, said peripheral wall comprising a screen having openings therein of size to permit passage of sand therethrough and retain larger objects on the interior of said tumbler, said objects being moved from the inlet to the outlet as the tumbler is rotated, operable conveyor means mounted on the frame and having a pick-up end portion for lifting and conveying debris and objects and collected sand from the surface of the beach to the inlet of said tumbler, said frame being substantially unobstructed below the tumbler to permit material passing through the openings of the peripheral wall to fall freely back to the beach surface, an elongated brush rotatably mounted on the frame and extending through the interior of the tumbler, said brush engaging the interior surface of the peripheral wall to clean the openings therein as the tumbler is rotated, said tumbler interior being otherwise substantially unobstructed, means on the frame to the rear of the tumbler for collecting objects which do not pass through the openings of the peripheral wall and which are discharged from the outlet of the tumbler, stationary means on the frame adjacent the outlet end of said tumbler having an opening therein for guiding and directing debris and objects coming from said tumbler to said means for collecting objects, and drive means mounted on the frame adapted to be driven from a power source for drivingly rotating the tumbler, the brush and for operating the conveyor means.

2. The beach cleaner of claim 1 further including flexible seal means carried by the tumbler and surrounding the outlet thereof, and said seal means engaging said stationary member to prevent movement of material back to the beach as material moves from the outlet of the tumbler to the collector means.

3. The beach cleaner of claim 1 further characterized in that there is provided paddle wheel means on the frame adjacent the pick up end portion for cooperating with the conveyor means to move the objects from the beach onto the conveyor means.

4. The beach cleaner of claim 3 further characterized in that the paddle wheel means includes a plurality of circumferentially spaced, resilient, generally radially extending flaps.

5. The beach cleaner of claim 4 wherein it has a normal forward direction of movement over the beach, further characterized in that there is provided on the frame forwardly diverging guide means for directing material toward the pick up portion as the cleaner moves forwardly.

6. The beach cleaner of claim 5 further characterized in that guide means comprises a pair of guide plates having laterally spaced rear end portions adjacent the pick up end portion and front end portions that are more remotely laterally spaced than the rear end portions, and means for resiliently mounting the plate rear end portions on the frame to normally retain the plates in a datum relationship to one another while permitting the plate front end portions moving vertically a limited amount.

7. The apparatus of claim 6 further characterized in that the plate mounting means includes means for mounting the plates for pivotal movement about generally horizontal axes, and means for limiting the pivotal movement of the plates in directions that the plates front ends move to lower elevations, means connected to the frame for resiliently urging the plates to move their front end portions downwardly and means mounted on the frame for limiting spreading apart movement of the plate front end portions.

8. A beach cleaner for separating larger objects from sand and having a normal forward direction of travel comprising a frame, a tumbler rotatably mounted on the frame, said tumbler including an inlet, an outlet remote from the inlet and a peripheral wall portion extending between the inlet and outlet and having openings therein to permit the passage of sand therethrough and retain larger objects therein to move from the inlet to the outlet as the tumbler is rotated, operable conveyor means mounted on the frame for conveying sand and larger objects from the beach to the inlet, said conveyor means having a front sand and large object pick-up end portion, a pair of guide plates having front and rear end portions for directing sand and larger objects on the beach toward the pick-up end portion as the cleaner moves forwardly, said frame including a frame mounting portion for each guide plate, means mounting the guide plates on the frame mounting portion in forwardly divering relationship for limited vertical and lateral movement relative the frame and one another, means connected between the respective guide plate and frame for resiliently urging the guide plate front end portion downwardly and means for limiting the downward movement of the guide plate front end portion.

9. The beach cleaner of claim 8 and beater means mounted on the frame adjacent to and extending above the conveyor means pick-up end portion for cooperating with the conveyor means to direct material from the beach onto the conveyor means, said beater means comprising a transverse mounting member mounted on the frame for rotation about a transverse axis and a plurality of angular spaced, transversely extending resilient flaps mounted on the mounting member to extend outwardly thereof.

10. The apparatus of claim 8 further characterized in that the tumbler peripheral wall portion comprises an annular screen and brush means rotatably mounted on the frame and extending through the interior of the tumbler in brushing engagement with the screen to dislodge picked up objects from the screen as the tumbler rotates.

* * * * *